US009914171B2

(12) United States Patent
Cameron et al.

(10) Patent No.: US 9,914,171 B2
(45) Date of Patent: Mar. 13, 2018

(54) MANUFACTURING METHOD

(71) Applicants: ROLLS-ROYCE PLC, London (GB); ROLLS-ROYCE DEUTSCHLAND LTD & CO KG, Dahlewitz (DE)

(72) Inventors: Mitchel Cameron, Johnstone (GB); Iain McLarnon, Wemyss Bay (GB); Roland Heinrich, Dahlewitz (DE)

(73) Assignees: ROLLS-ROYCE plc, London (GB); ROLLS-ROYCE DEUTSCHLAND LTD & CO KG, Dahlewitz (DE)

( * ) Notice: Subject to any disclaimer, the term of this patent is extended or adjusted under 35 U.S.C. 154(b) by 159 days.

(21) Appl. No.: 14/873,994

(22) Filed: Oct. 2, 2015

(65) Prior Publication Data
US 2016/0107238 A1    Apr. 21, 2016

(30) Foreign Application Priority Data

Oct. 15, 2014   (GB) .................................. 1418258.8

(51) Int. Cl.
| B22F 5/04 | (2006.01) |
| B22F 3/10 | (2006.01) |
| B22F 3/22 | (2006.01) |
| B22F 3/24 | (2006.01) |
| B22F 3/12 | (2006.01) |

(52) U.S. Cl.
CPC .............. *B22F 5/04* (2013.01); *B22F 3/1025* (2013.01); *B22F 3/12* (2013.01); *B22F 3/225* (2013.01); *B22F 3/24* (2013.01); *B22F 2003/247* (2013.01); *B22F 2998/10* (2013.01)

(58) Field of Classification Search
CPC .. B22F 5/04; B22F 3/1025; B22F 3/12; B22F 3/225; B22F 3/24; B22F 2003/247; B22F 2998/10
See application file for complete search history.

(56) References Cited

U.S. PATENT DOCUMENTS

| 2007/0017817 | A1 | 1/2007 | Mueller et al. |
| 2007/0243069 | A1* | 10/2007 | Read .................... B21D 26/055 416/229 R |
| 2008/0290215 | A1* | 11/2008 | Udall ...................... F01D 5/147 244/123.14 |
| 2013/0156626 | A1* | 6/2013 | Roth-Fagaraseanu .. B22F 3/225 419/6 |
| 2013/0272862 | A1 | 10/2013 | Chung |

FOREIGN PATENT DOCUMENTS

| EP | 1719566 A2 | 11/2006 |
| FR | 2 949 366 A1 | 3/2011 |

OTHER PUBLICATIONS

Mar. 7, 2016 Search Report issued in European Patent Application No. 15 18 8172.
Dec. 15, 2014 Search Report issued in British Patent Application No. 1418258.8.

* cited by examiner

*Primary Examiner* — Jennifer A Smith
*Assistant Examiner* — Alexandra M Moore
(74) *Attorney, Agent, or Firm* — Oliff PLC

(57) ABSTRACT

The present invention provides a method of forming a leading edge for an aerofoil component e.g. an aerofoil blade. The method comprises forming a pre-form having a precursor edge and processing said precursor edge to form the leading edge. The pre-form is formed using metal injection molding. The leading edge may have an elliptical profile.

9 Claims, 3 Drawing Sheets

MANUFACTURING METHOD

CROSS-REFERENCE TO RELATED APPLICATIONS

This application is based upon and claims the benefit of priority from British Patent Application Number 1418258.8 filed 15 Oct. 2015, the entire contents of which are incorporated by reference.

BACKGROUND

1. Field of the Disclosure

The present disclosure relates to a method of manufacturing components for gas turbine engines and, in particular, to a method of manufacturing a leading edge for an aerofoil component.

2. Description of the Related Art

With reference to FIG. 1, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Aerofoil components include blades and vanes which are incorporated in the propulsive fan 12, compressors 13, 14 and turbines 16, 17, 18.

As shown in FIG. 2 (which is cross-section through the leading edge of an aerofoil component), these aerofoil components each comprise a suction surface 25 and an opposing pressure surface 26 which meet at a leading edge 37 and a trailing edge (not shown), the two edges being axially opposed to one another. The aerofoil components are typically formed from cast or forged stock (which has the profile 38 shown in dotted lines in FIG. 2) which is processed to form a pre-form having a sharp precursor edge 39. This precursor edge 39 is subsequently processed to produce a radius e.g. to form a leading edge 37 with an elliptical profile.

Using this known method makes it difficult to reliably and consistently obtain the optimum profile of the leading edge. The processing of the cast or forged stock to create the pre-form takes no account of the quality or conformance of the cast/forged stock and thus the precursor edge can vary from the desired profile. Similarly, subsequent processing of the pre-form to create the leading edge takes no account of any variance of the precursor edge from the desired profile and thus it is difficult to ensure that the leading edge is formed with the optimum profile. Any deviation from the optimum profile of the leading edge can result in sub-optimal aerodynamic performance of the component which, in turn, leads to sub-optimal efficiency of the gas turbine engine.

In addition, the known method is difficult to apply at the portions of an aerofoil component where the leading edge joins the filleted mounting portions of the component (which are provided to mount at least one end of the component within the fan/compressor/turbine).

Metal Injection Moulding (MIM) is a known technique for producing metal components. Metal powder is mixed with a thermoplastic binder to generate a feedstock which is subsequently shaped by injection into a die to create a 'green' component. The green component is treated (e.g. thermally or chemically) to remove the binder and is then subjected to a sintering treatment to consolidate the metal and form the metal component (which may be subsequently surface finished).

OBJECTS AND SUMMARY

There are disclosed herein methods of manufacturing a leading edge for an aerofoil component where the leading edge can be reliably and consistently formed with reduced variation from the optimum profile.

In a first aspect, there is provided a method of forming a leading edge of an aerofoil component, said method comprising:

forming a pre-form having a precursor edge; and processing said precursor edge to form the leading edge; wherein said pre-form is formed using metal injection molding.

In a second aspect, there is provided a method of forming an aerofoil component having a leading edge, said method comprising:

forming a pre-form having a precursor edge; and processing said precursor edge to form the leading edge; wherein said pre-form is formed using metal injection molding By forming the pre-form using metal injection moulding (MIM), the number of processing steps is reduced as the pre-form can be formed in a single MIM step rather than being formed by a casting/forging step followed by a processing step. Furthermore, material wastage is reduced as it is no longer necessary to remove cast/forged material to form the pre-form. MIM is capable of reliably and consistently producing components with minimal variation and thus variations in the pre-form, in particular at the precursor edge, are significantly reduced. This, in turn, reduces variations at the leading edge generated by the subsequent processing.

Optional features will now be set out. These are applicable singly or in any combination with any aspect.

In some embodiments, the pre-form has a substantially aerofoil shape and the leading edge is integrally formed with the aerofoil component.

As discussed above, metal injection moulding comprises mixing powdered metal or metal alloy with a binder, shaping the mixture by injection into a mould/die to form a green component, removing the binder from the green component and consolidating the metal/metal alloy powder using heat.

Accordingly, the step of forming said pre-form may comprise:

mixing powdered metal or metal alloy with a binder;
shaping the mixture by injection into a die to form a green component;
removing the binder from the green component; and
consolidating the metal/metal alloy powder using heat to form the pre-form.

In some embodiments, the powdered metal or metal alloy is a titanium alloy, a nickel alloy, stainless steel, tungsten carbide or copper alloy.

In some embodiments, the binder is a thermoplastic plastic or a wax.

In some embodiments, the binder is removed from the green component using a solvent (e.g. trichloroethane) and/or by heating the green component.

In some embodiments, the precursor edge is a sharp edge. The precursor edge may be sharper than the leading edge of the finished component. The precursor edge may be described as forming (or being) an apex.

In some embodiments, processing said precursor edge to form the leading edge comprises processing said precursor edge (e.g. by a mechanised vibratory finishing system) to form a leading edge having an elliptical profile.

In some embodiments, the aerofoil component is a blade for a fan, compressor or turbine.

In a third aspect, the present invention provides a fan, compressor or turbine comprising an aerofoil component having a leading edge formed according to the first or second aspect.

In a fourth aspect, the present invention provides a gas turbine engine comprising an aerofoil component having a leading edge formed according to the first or second aspect.

BRIEF DESCRIPTION OF THE DRAWINGS

Embodiments of the invention will now be described by way of example with reference to the accompanying drawings in which:

FIG. 3 shows a cross-section through the leading edge of an aerofoil blade. The leading edge 27 extends along the join of the pressure surface 26 and suction surface 25.

DETAILED DESCRIPTION OF EMBODIMENTS

Figure 1:
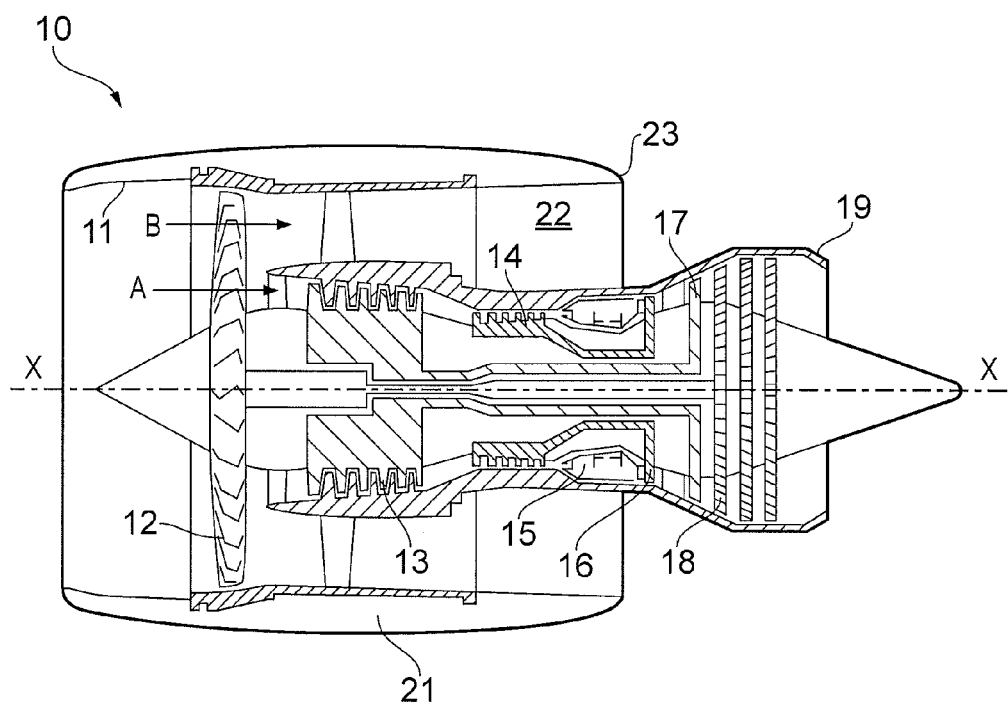
FIG. 1 shows a ducted fan gas turbine engine.
Figure 2:
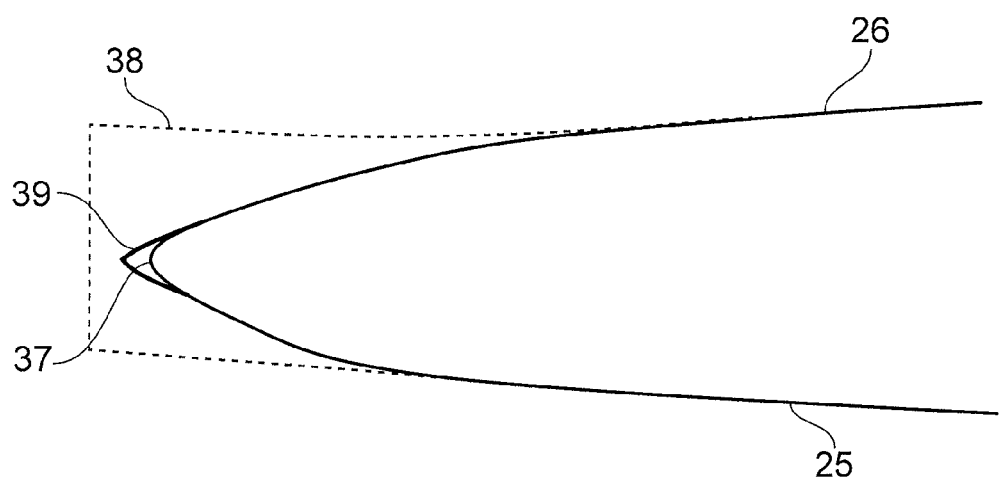
FIG. 2 shows a cross-section through the leading edge of an aerofoil component formed according to the prior art.
Figure 3:
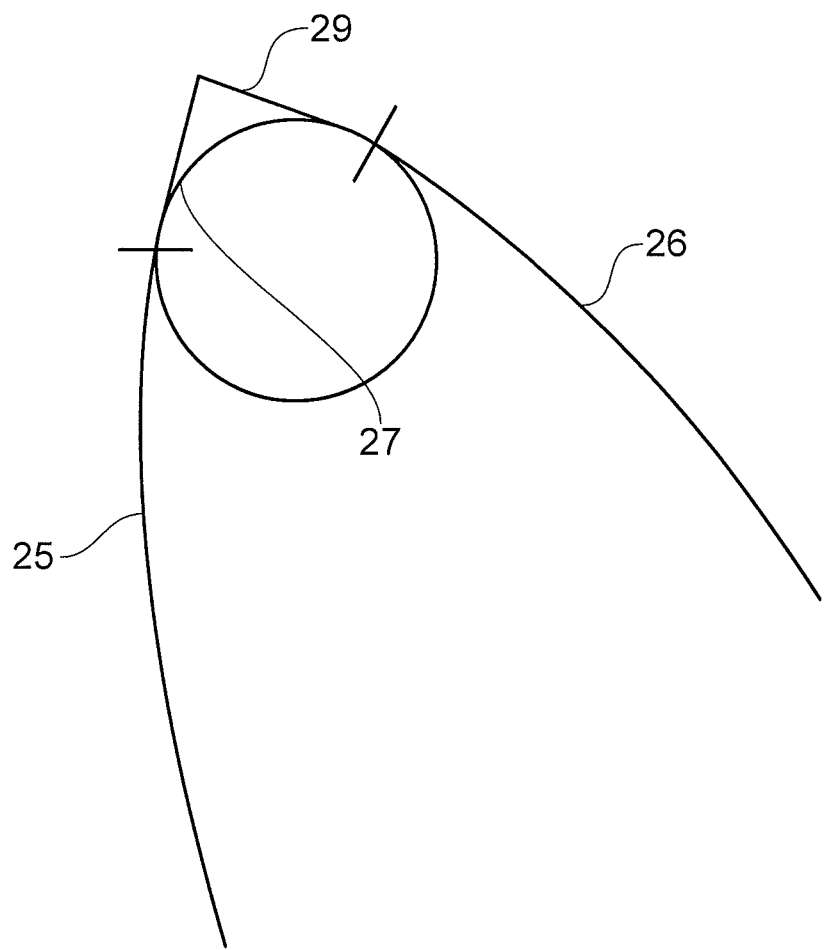
FIG. 3 shows a cross-section through the leading edge of an aerofoil blade formed according to the present disclosure.

The leading edge 27 is created by initially forming a pre-form having a sharp precursor edge 29. The pre-form is prepared by mixing powdered titanium alloy (or other suitable metal powder) with a thermoplastic plastic binder and injecting it into a die having the desired pre-form shape.

The die is opened to retrieve a green component which is subjected to solvent and thermal de-binding to remove the binder. Next, the green component is heated to sinter and consolidate the metal/metal alloy powder to form the pre-form having the precursor edge 29.

Next, the precursor edge 29 is processed using a mechanised vibratory finishing system to form the leading edge 27. The leading edge 27 may have an elliptical profile, as in the illustrated example.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the scope of the invention.

All references referred to above are hereby incorporated by reference.

We claim:

1. A method of forming a leading edge of an aerofoil component, the method comprising:
    forming a pre-form having a precursor edge; and
    processing the formed precursor edge of the pre-form to form the leading edge of the aerofoil component, wherein:
        the pre-form is formed using metal injection molding, and
        the formed precursor edge is sharper than the formed leading edge of the aerofoil component, which is formed as a result of the processing.

2. A method of forming an aerofoil component having a leading edge, the method comprising forming the leading edge according to the method of claim 1.

3. The method according to claim 1, wherein forming the pre-form includes:
    mixing powdered metal or metal alloy with a binder;
    shaping the mixture by injection into a die;
    removing the binder; and
    consolidating the metal/metal alloy powder using heat.

4. The method according to claim 3, wherein the binder is a thermoplastic plastic.

5. The method according to claim 3, further comprising removing the binder using a solvent.

6. The method according to claim 1, further comprising processing the precursor edge to form the leading edge having an elliptical profile.

7. The method according to claim 1, wherein the step of processing the precursor edge includes mechanical vibratory processing.

8. The method according to claim 1, wherein the aerofoil component is a blade for a fan, a compressor, or a turbine.

9. A method of manufacturing a fan, a compressor, or a turbine, the method comprising forming a leading edge of a blade of an aerofoil using the method of claim 1.

* * * * *